(12) United States Patent
Miyama et al.

(10) Patent No.: US 10,468,947 B2
(45) Date of Patent: Nov. 5, 2019

(54) ROTARY ELECTRIC MACHINE

(71) Applicant: Mitsubishi Electric Corporation, Chiyoda-ku (JP)

(72) Inventors: Yoshihiro Miyama, Chiyoda-ku (JP); Hideaki Arita, Chiyoda-ku (JP); Akihiro Daikoku, Chiyoda-ku (JP)

(73) Assignee: MITSUBISHI ELECTRIC CORPORATION, Chiyoda-ku (JP)

( * ) Notice: Subject to any disclaimer, the term of this patent is extended or adjusted under 35 U.S.C. 154(b) by 198 days.

(21) Appl. No.: 15/571,133

(22) PCT Filed: Apr. 5, 2016

(86) PCT No.: PCT/JP2016/061150
§ 371 (c)(1),
(2) Date: Nov. 1, 2017

(87) PCT Pub. No.: WO2016/199486
PCT Pub. Date: Dec. 15, 2016

(65) Prior Publication Data
US 2018/0175707 A1    Jun. 21, 2018

(30) Foreign Application Priority Data

Jun. 9, 2015 (JP) .................................. 2015-116663

(51) Int. Cl.
*H02K 9/22* (2006.01)
*H02K 1/20* (2006.01)
(Continued)

(52) U.S. Cl.
CPC ............... *H02K 9/22* (2013.01); *H02K 1/146* (2013.01); *H02K 1/20* (2013.01); *H02K 3/12* (2013.01);
(Continued)

(58) Field of Classification Search
CPC ............ H02K 9/22; H02K 3/345; H02K 3/24; H02K 1/20; H02K 5/20
See application file for complete search history.

(56) References Cited

U.S. PATENT DOCUMENTS 3,688,137 A * 8/1972 Filhol .................... H01B 3/002
310/43
8,174,173 B2 * 5/2012 Makino .............. H02K 15/0031
310/216.115

(Continued)

FOREIGN PATENT DOCUMENTS

JP     2001-095188 A    4/2001
JP     2005-269786 A    9/2005
(Continued)

OTHER PUBLICATIONS

International Search Report dated Jun. 28, 2016 in PCT/JP2016/061150, filed on Apr. 5, 2016.

*Primary Examiner* — Dang D Le
(74) *Attorney, Agent, or Firm* — Oblon, McClelland, Maier & Neustadt, L.L.P.

(57) ABSTRACT

A motor according to the present invention includes: a stator core that surrounds an outer circumference of a rotor, and that includes: a yoke portion; and a plurality of tooth portions in which tip portions protrude radially inward toward a central axis of the rotor from an inner circumferential surface of the yoke portion; a heat sink that is disposed so as to face a first end surface of the stator core in an axial direction of the stator core; a stator coil that includes phase coil portions that are configured using conducting wires that are mounted to the stator core; and a coil fixing member that is disposed on coil end portions of the phase coil portions, that fixes the coil end portions in a state of surface contact with the heatsink.

25 Claims, 12 Drawing Sheets

(51) Int. Cl.
*H02K 1/14* (2006.01)
*H02K 3/12* (2006.01)
*H02K 3/34* (2006.01)
*H02K 15/04* (2006.01)
*H02K 3/52* (2006.01)
*H02K 5/20* (2006.01)
*H02K 3/28* (2006.01)
*H02K 3/24* (2006.01)

(52) U.S. Cl.
CPC ............ *H02K 3/345* (2013.01); *H02K 3/522* (2013.01); *H02K 5/20* (2013.01); *H02K 15/0414* (2013.01); *H02K 3/24* (2013.01); *H02K 3/28* (2013.01)

(56) References Cited

U.S. PATENT DOCUMENTS

| | | |
|---|---|---|
| 2010/0019588 A1 | 1/2010 | Makino et al. |
| 2013/0020891 A1 | 1/2013 | Kishi et al. |
| 2016/0149472 A1* | 5/2016 | Pal .......................... H02K 9/22 310/64 |
| 2018/0337572 A1* | 11/2018 | Miyama ................. H02K 3/522 |

FOREIGN PATENT DOCUMENTS

| | | |
|---|---|---|
| JP | 2007-104783 A | 4/2007 |
| JP | 2008-259383 A | 10/2008 |
| JP | 2010-035310 A | 2/2010 |
| JP | 2012-196079 A | 10/2012 |
| JP | 2013-027173 A | 2/2013 |

* cited by examiner

ROTARY ELECTRIC MACHINE

TECHNICAL FIELD

The present invention relates to a rotary electric machine that has a stator coil that includes phase coil portions that are constituted by conducting wires that are mounted into a stator core.

BACKGROUND ART

In rotary electric machines that are configured such that a stator coil is cooled by a frame being cooled, thermal resistance between a stator core and the stator coil is high, and coil temperature increases during heavy loads. Thus, because output is limited or the apparatus is increased in size in order to prevent the coil temperature from exceeding an upper temperature limit, one problem has been that power density is reduced.

Conventionally, in answer to problems of this kind, methods have been disclosed to improve the power density by adopting a configuration in which a ring-shaped groove is disposed at a load side of a load-side bracket that is adjacent to a stator, a ceramic film is disposed therein, and then end portions of windings that are wound into the stator core are inserted into the ring-shaped groove, enabling heat generated in windings also to be radiated through the load-side bracket in order to reduce the coil temperature (see Patent Literature 1, for example).

CITATION LIST

Patent Literature

Patent Literature 1: Japanese Patent Laid-Open No. 2010-035310 (Gazette)

SUMMARY OF THE INVENTION

Problem to be Solved by the Invention

Coil upper temperature limits of rotary electric machines are determined by the portion that has the highest temperature inside the coils. In conventional stator constructions, the coils are mounted to the stator core, but generally the coils are only partially in contact with the stator core, giving rise to large irregularities in the thermal resistance between the coils and the stator core.

Because irregularities arise in the axial heights of the respective coils that are mounted to the stator core that is described in Patent Literature 1 above, irregularities arise in the thermal resistance between the coils and the bracket, also giving rise to irregularities in the coil temperature.

Thus, one problem has been that the efficacy of radiating the heat generated in the coils from the bracket is reduced significantly if there are coils that are in poor contact with the bracket.

The present invention aims to solve the above problems and an object of the present invention is to provide a rotary electric machine in which power density is improved by reducing irregularities in coil temperature to relieve upper temperature limits.

Means for Solving the Problem

A rotary electric machine according to the present invention includes: a stator core that surrounds an outer circumference of a rotor, and that includes; a yoke portion; and a plurality of tooth portions in which tip portions protrude radially inward toward a central axis of the rotor from an inner circumferential surface of the yoke portion; a heat sink that is disposed so as to face a first end surface of the stator core in an axial direction of the stator core; a stator coil that includes phase coil portions that are configured using conducting wires that are mounted to the stator core; and a coil fixing member that is disposed on coil end portions of the phase coil portions, that fixes the coil end portions in a state of surface contact with the heatsink.

Effects of the Invention

According to the rotary electric machine according to the present invention, because coil end portions of phase coil portions come into surface contact with a heatsink due to coil fixing members, irregularities in stator coil temperature are reduced, improving power density by relieving upper temperature limits.

DESCRIPTION OF EMBODIMENTS

Respective motors that constitute embodiments of the rotary electric machine according to the present invention will now be explained based on the drawings, and identical or corresponding members and portions in each of the drawings will be given identical numbering.

Embodiment 1

Figure 1:
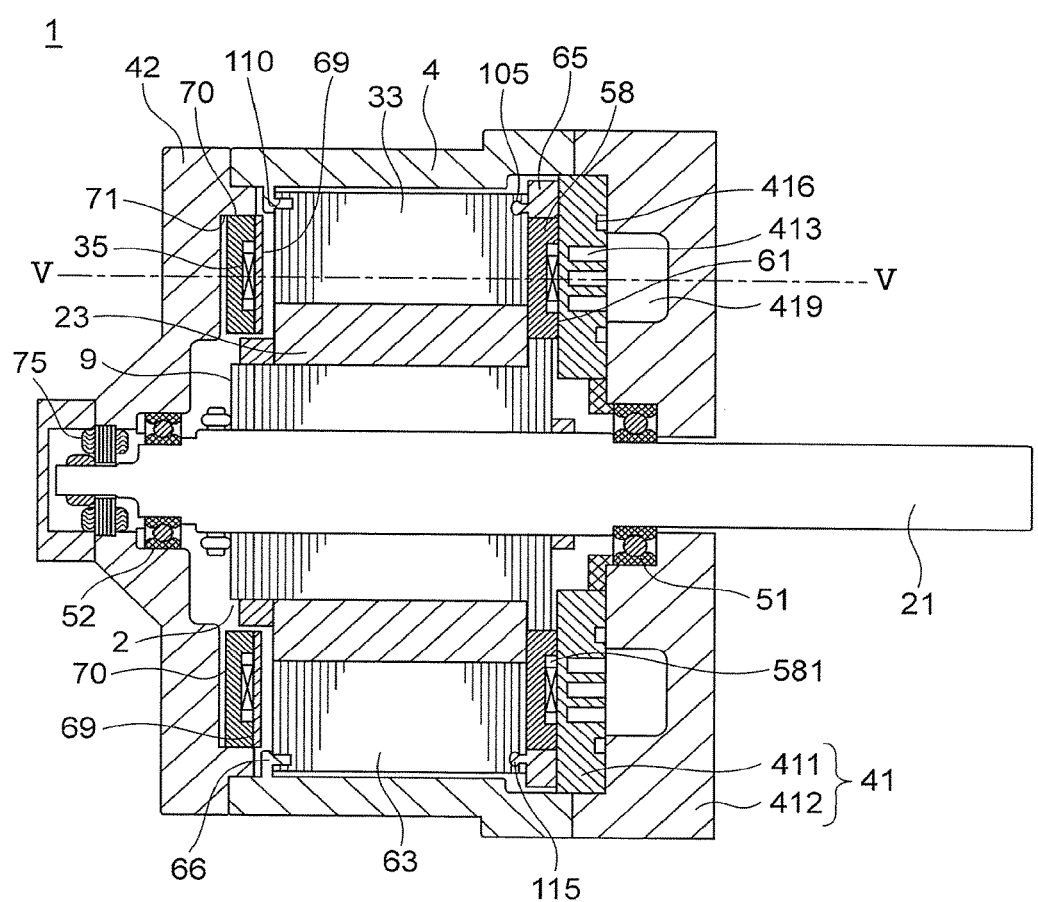
FIG. 1 is a cross section that shows a motor according to Embodiment 1 of the present invention.
Figure 2:
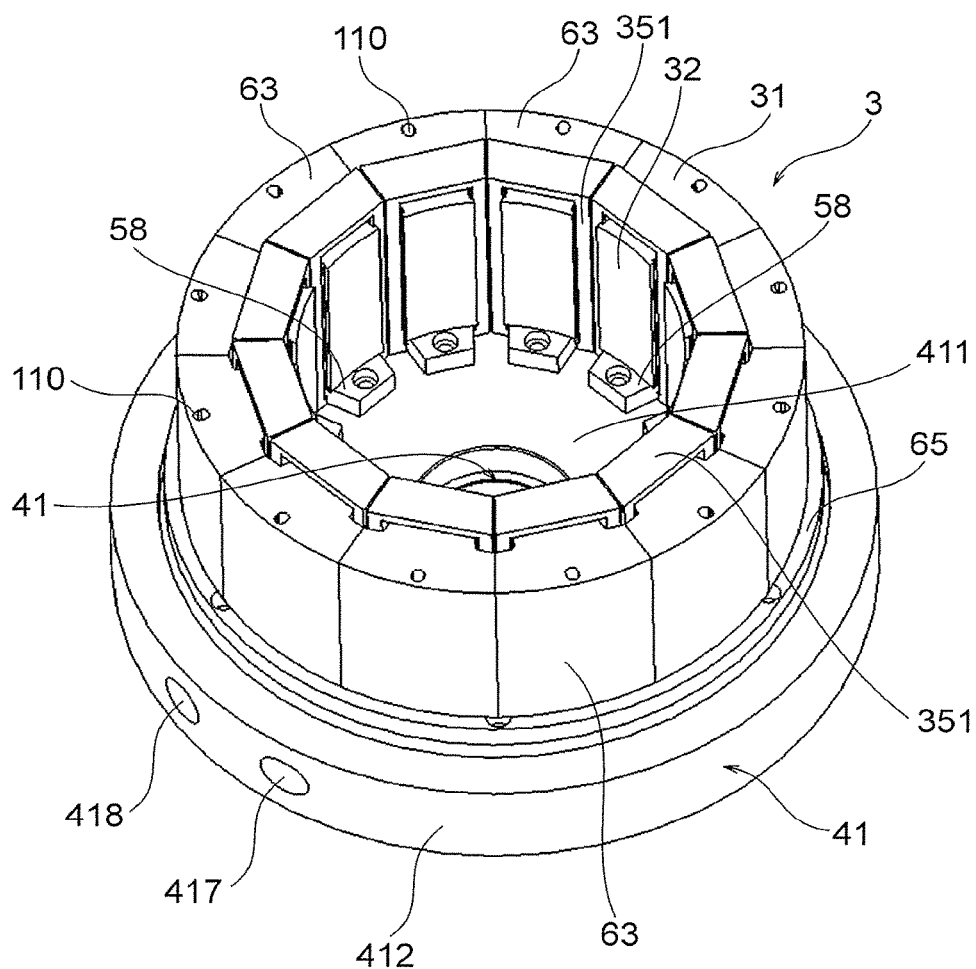
FIG. 2 is an oblique projection that shows a stator, a frame, and a load-side bracket from FIG. 1.
Figure 3:
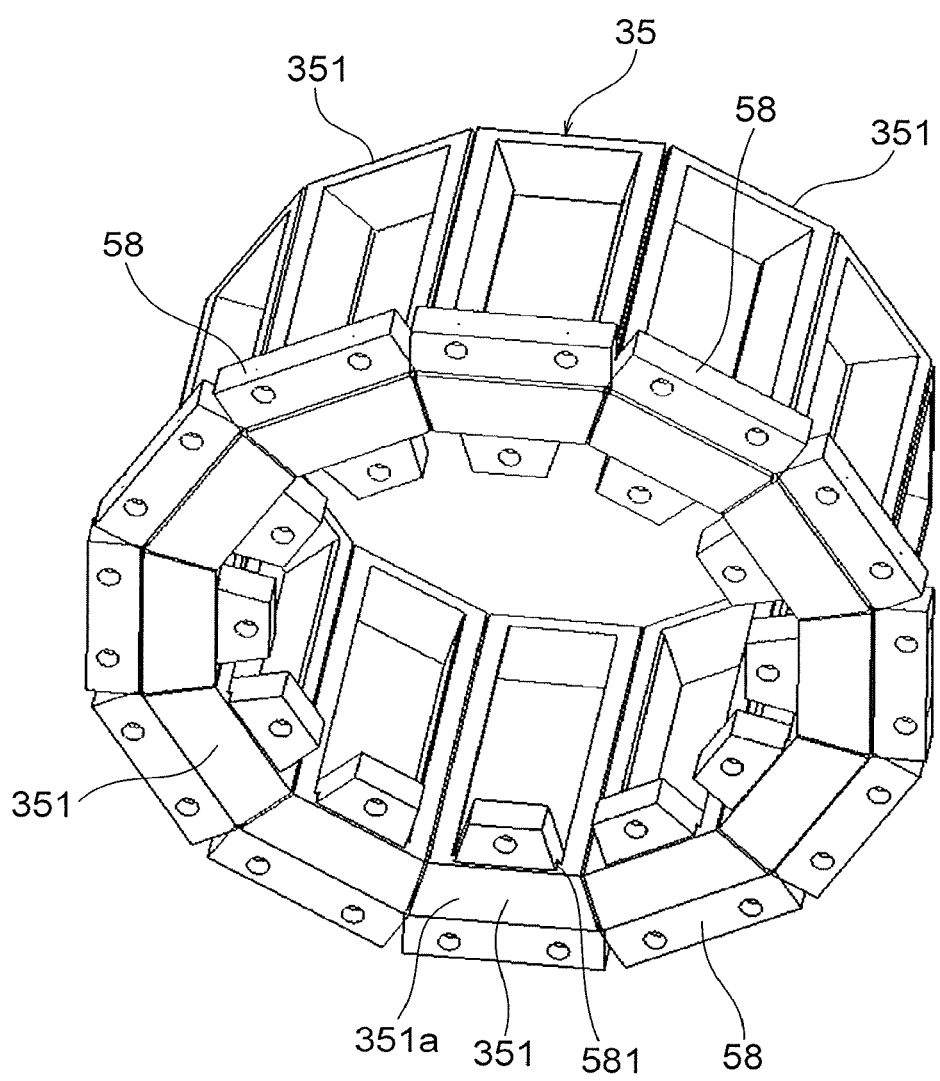
FIG. 3 is an oblique projection that shows a stator coil and coil fixing members from FIG. 1.
Figure 4:
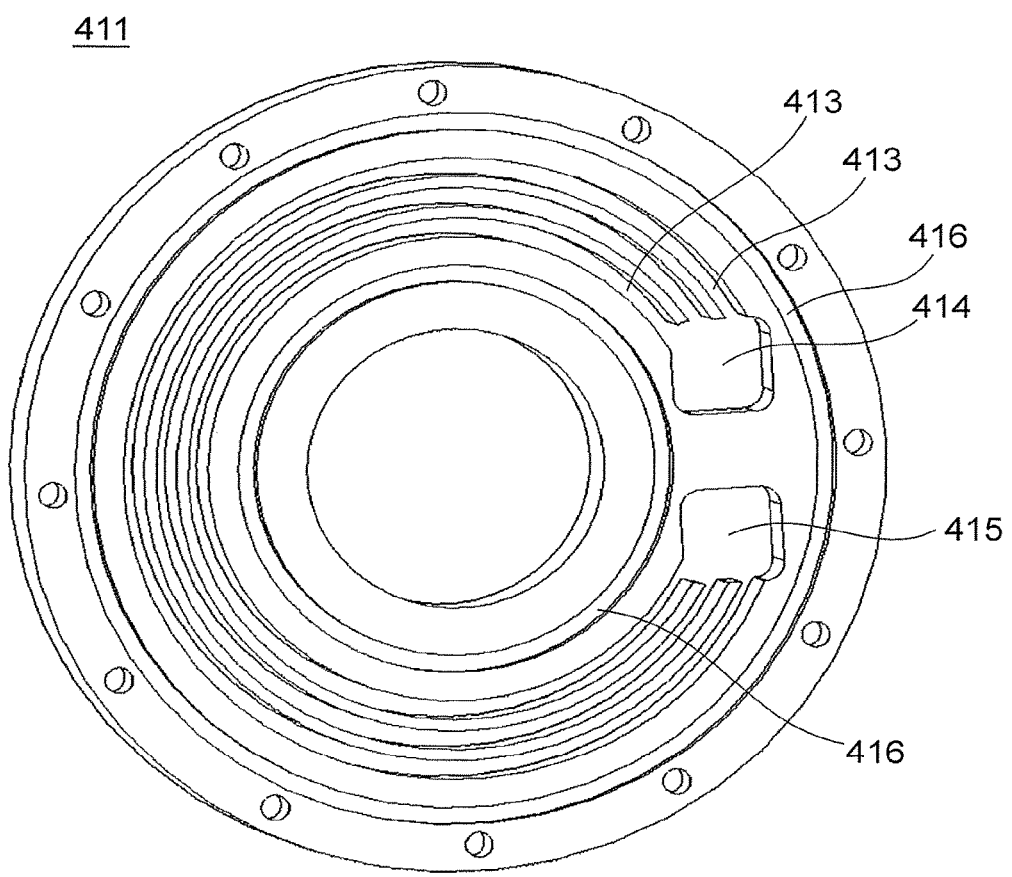
FIG. 4 is an oblique projection that shows a heatsink from FIG. 1.
Figure 5:
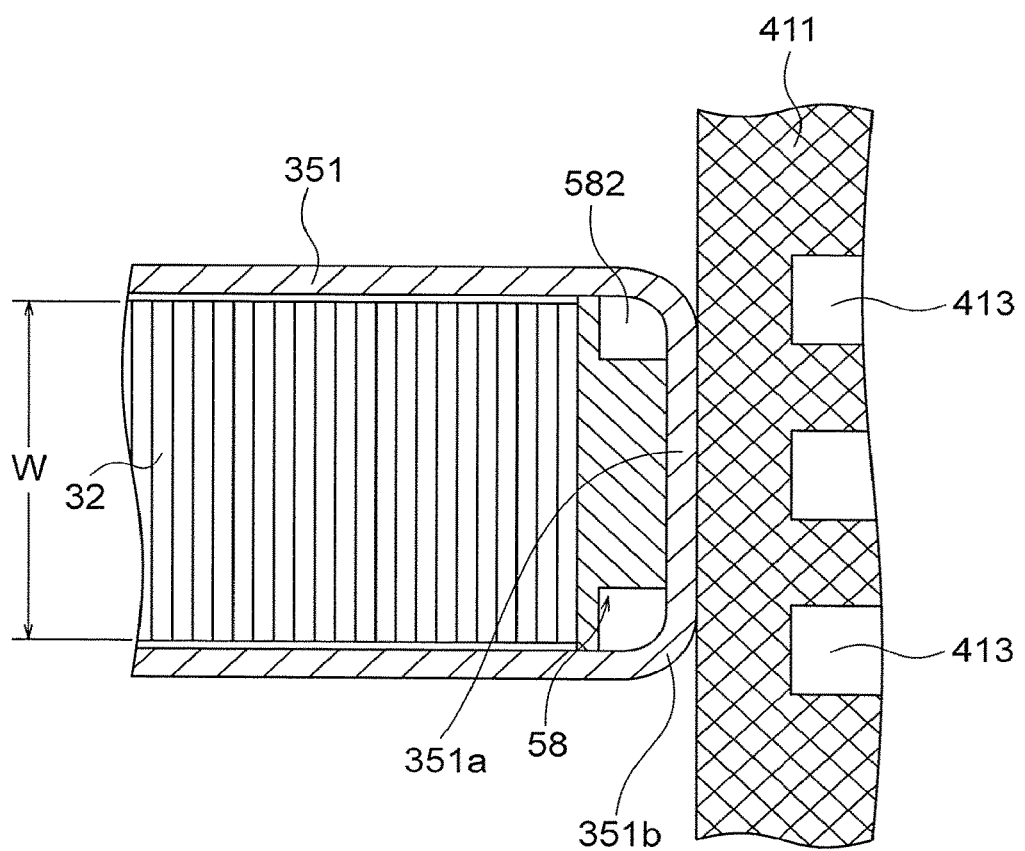
FIG. 5 is a cross section of a coil fixing member that is taken along Line V-V in FIG. 1 so as to be viewed in the direction of the arrows.

FIG. 1 is a cross section that shows a motor 1 according to Embodiment 1 of the present invention, FIG. 2 is an oblique projection that shows a stator 3, a frame 4, and a load-side bracket 41 from FIG. 1, FIG. 3 is an oblique projection that shows a stator coil 35 and coil fixing members 58 from FIG. 1, FIG. 4 is an oblique projection that shows a load-side heatsink 411 from FIG. 1, and FIG. 5 is a cross section of a coil fixing member 58 that is taken along Line V-V in FIG. 1 so as to be viewed in the direction of the arrows.

A motor 1 that constitutes this rotary electric machine is a ten-pole twelve-slot concentrated winding permanent magnet motor, and includes: a rotor 2; and a stator 3 that is disposed so as to surround an outer circumference of the rotor 2 so as to have a constant air gap interposed from the rotor 2; a cylindrical frame 4 that surrounds an outer circumference of this stator 3, and that holds and fixes the stator 3; a load-side bracket 41 that constitutes a first bracket that is disposed at a load side in an axial direction of this frame 4; a non-load-side bracket 42 that constitutes a second bracket that is disposed at an opposite end of the frame 4 in the axial direction; and coil fixing members 58 that are disposed between the load-side bracket 41 and the stator 3.

The above-mentioned rotor 2 has: a shaft 21 that is rotatably supported by the load-side bracket 41 and the non-load-side bracket 42 so as to have a load-side bearing 51 and a non-load-side bearing 52 respectively interposed; a spider 9 that is fitted over the shaft 21; and a rotor core 23 that is configured by laminating laminated steel plates that is disposed on an outer circumferential surface of this spider 9. Although not shown, ten permanent magnets that are disposed circumferentially such that North-seeking (N) poles alternately face inward and outward are embedded in the rotor core 23 in a vicinity of an outer circumferential surface thereof.

The stator 3 has: an annular stator core 33; and a stator coil 35 that is wound onto the stator core 33.

The stator core 33 is constituted by $3n$ (an integer) stator core pieces 63 (in this embodiment, twelve). The stator core pieces 63, which are configured using laminated steel plates, each have: a circular arc-shaped yoke portion 31; and a tooth portion 32 that has a tip portion that protrudes radially inward toward a central axis of the stator 3 from a circumferentially central portion on an inner circumferential surface of the yoke portion 31.

The stator coil 35 has a plurality of phase coil portions 351 for each of a U phase, a V phase, and a W phase.

Each of the phase coil portions 351 is constituted by a concentrated winding coil by winding a rectangular conductor wire that constitutes a conducting wire into a single layer edgewise onto the tooth portion 32 of a stator core piece 63 so as to have insulators (not shown) interposed.

The load-side bracket 41 is constituted by: a load-side heatsink 411 that is shown in FIG. 4; and a bracket base 412 that has a larger diameter than this load-side heatsink 411 and that covers a single side surface of the load-side heatsink 411.

The load-side heatsink 411, which constitutes a first heat sink, has: mutually parallel refrigerant passages 413 that extend circumferentially on a surface thereof near the bracket base 412; a coolant inflow port 414 that is formed at a starting end portion of these refrigerant passages 413; a coolant outflow port 415 that is formed at a terminal portion of the refrigerant passages 413; and two ring grooves 416 that are formed so as to extend circumferentially on a radially inner side and a radially inner side, respectively, of the refrigerant passages 413.

An electrically insulating coating that constitutes an electrically insulating medium and that is made of a fluorine resin is applied to a coil fixing surface 61 on an opposite side of the load-side heatsink 411 from the bracket base 412.

The bracket base 412 has: a refrigerant passage 419 that extends circumferentially on a surface thereof near the load-side heatsink 411; a coolant input port 417 that is formed at a starting end portion of this refrigerant passage 419; and a coolant output port 418 that is formed at a terminal portion of the refrigerant passage 419.

The load-side heatsink 411 and the bracket base 412 are integrated by fastening in an axial direction using bolts in a state in which two O-rings (not shown) are respectively disposed in the pair of ring grooves 416 of the load-side heatsink 411.

Moreover, it is desirable for the load-side heatsink 411 to be manufactured using a material that has good thermal conductivity such as aluminum, etc.

As shown in FIG. 3, the coil fixing members 58 each have a groove portion 581 that faces a coil end portion of each of the phase coil portions 351 and that houses a crossover portion 351a of each of the phase coil portions 351 on a side near the load-side bracket 41. These coil fixing members 58 are fixed to the load-side heatsink 411 using bolts.

Moreover, an axial depth of the groove portions 581 is approximately equal to an axial length of the crossover portions 351a. A radial length of the groove portions 581 is also approximately equal to a radial length of the crossover portions 351a.

As can be seen from FIG. 5, each of the coil fixing members 58 is manufactured such that a width W thereof is approximately equal to an inner circumferential width of the phase coil portion 351, and is positioned and fixed circumferentially alongside each of the phase coil portions 351. In order to avoid contact with the bent portions 351b of the phase coil portions 351, notch portions 582 that have a larger bending radius than the bent portions 351b are formed on two circumferential sides of each of the coil fixing members 58 near the load-side heatsink 411.

Moreover, each of the coil fixing members 58 is produced using an electrically insulating member, but they may be produced by applying an electrically insulating treatment to the surface of electroconductive members.

Each of the stator core pieces 63 of the stator core 33 has a circular load-side pin aperture 105 and non-load-side pin aperture 110 on root portions of the tooth portion 32 at the load-side and the non-load-side, respectively.

The stator core 33 is configured into an annular shape by the respective stator core pieces 63 being disposed on the non-load-side surface of the load-side heatsink 411 by means of the annular stator base 65. A phase coil portion 351 is mounted onto the tooth portion 32 of each of the stator core pieces 63.

The annular stator base 65 has twelve stator base pin portions 115 on a side surface that contacts the stator core 33, and positioning of a load-side of each of the stator core pieces 63 is performed by fitting these stator base pin portions 115 together with the load-side pin apertures 105.

A stator brace portion 66 that has an annular shape and that has twelve pins at a uniform pitch in a circumferential direction is disposed on an inner circumferential surface at a non-load-side of the frame 4. The stator core pieces 63 are clamped and fixed between the stator base 65 and the stator brace portion 66 in the axial direction in a state in which the respective pins of the stator brace portion 66 are inserted into the respective non-load-side pin apertures 110 of the stator core pieces 63 by the frame 4 being fixed to the load-side bracket 41.

Figure 6:
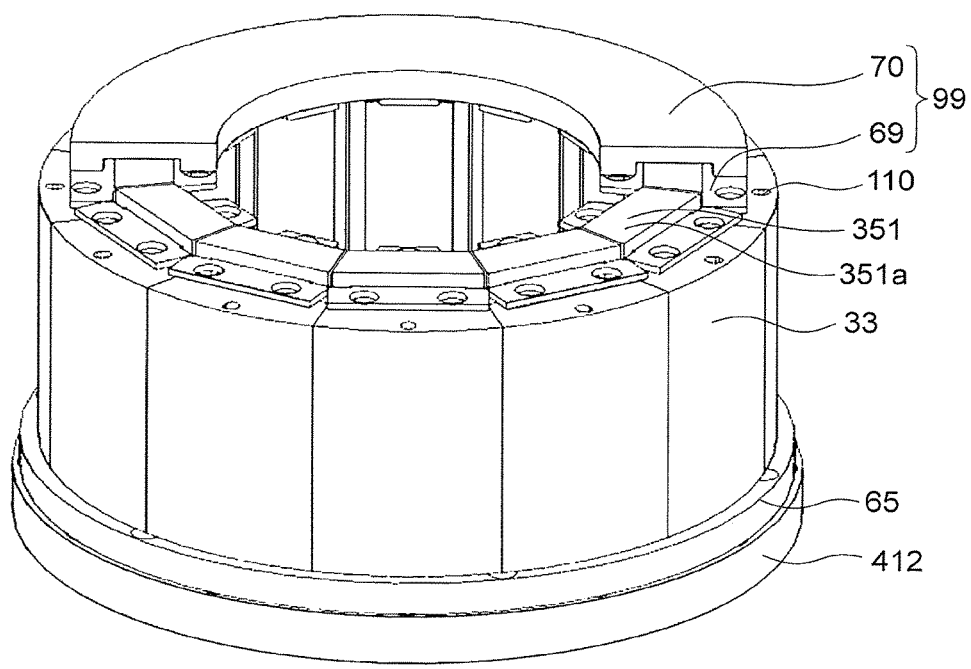
FIG. 6 is an oblique projection that shows a non-load-side coil fixing member of the motor in FIG. 1.

As shown in FIG. 6, non-load-side coil inner circumference fixing members 69 are respectively disposed at the non-load-side of each of the phase coil portions 351 of the stator coil 35 between inner surfaces of the crossover portions 351a of each of the phase coil portions 351 and the non-load-side end surfaces of the tooth portions 32.

A non-load-side coil outer circumference fixing member 70 that has a single ring shape and an angular C-shaped cross section is disposed so as to face these non-load-side coil inner circumference fixing members 69. A non-load-side portion of each of the phase coil portions 351 is clamped between a non-load-side coil inner circumference fixing member 69 and the non-load-side coil outer circumference fixing member 70. The respective non-load-side coil inner circumference fixing members 69 are fixed to the non-load-side coil outer circumference fixing member 70 by bolts, etc., to constitute a non-load-side coil fixing member 99. A non-load-side of the stator coil 35 is fixed by the non-load-side coil outer circumference fixing member 70 being fitted into a coil fixing groove 71 that is formed on the non-load-side bracket 42 when the non-load-side bracket 42 is mounted to the frame 4.

The non-load-side bracket 42 and the non-load-side coil outer circumference fixing member 70 are configured so as to dispose an air gap portion in an axial direction. This air gap portion may be filled by an elastic member.

Moreover, it is desirable for the elastic member to be constituted by a metal mesh or a metal spring, etc., but it may be constituted by rubber or sponge, or a composite member thereof.

Moreover, a rotational position sensor 75 that detects a rotational position of the shaft 21 is mounted to the non-load-side bracket 42 and a non-load-side end portion of the shaft 21.

In the motor 1 according to Embodiment 1, electric current flows to each of the phase coil portions 351 from an electric power supplying portion.

As a result thereof, a rotating magnetic field is generated in the stator core 33 such that the rotor 2 is attracted to the rotating magnetic field and rotates, and the shaft 21, which is integrated with the rotor 2, also rotates, the torque therefrom being transmitted to the load side.

According to the motor 1 that has the above configuration, the coil end portions of the twelve phase coil portions 351 that constitute the stator coil 35 are each fixed in a state of surface contact with the load-side heatsink 411 by a separate coil fixing member 58. Thermal resistance between the stator coil 35 and the load-side heatsink 411 can thereby be reduced, improving cooling of the stator coil 35.

The positions of each of the phase coil portions 351 are fixed by the coil fixing members 58, reducing irregularities in position due to dimensional tolerances of each of the phase coil portions 351. Consequently, because contact area between the stator coil 35 and the load-side heatsink 411 can be kept constant, irregularities in thermal resistance between each of the twelve phase coil portions 351 are reduced. Because the upper temperature limit of each of the phase coil portions 351 and the overall temperature of the stator coil 35 are thereby brought closer to each other, output can be improved up to the temperature limit of the stator coil 35.

Because notch portions 582 are formed in the groove portions 581 of the coil fixing members 58 on two sides of inlet and outlet portions for the rectangular conductor wires, the coil fixing members 58 can avoid contact with the bent portions 351b of the phase coil portions 351, reducing damage when winding the rectangular conductor wires into concentrated windings and assembling them on the tooth portions 32, and also enabling rubbing on one side to be reduced.

A radial dimension of the stator core 33 at the groove portions 581 of the coil fixing members 58 is equal to a radial dimension of the crossover portions 351a of the phase coil portions 351. An axial dimension of the stator core 33 at the groove portions 581 is also equal to an axial dimension of the crossover portions 351a. Thus, each of the phase coil portions 351 of the stator coil 35 is reliably fixed to the load-side heatsink 411 in two directions, i.e., axially and radially by fixing each of the coil fixing members 58 axially to the load-side heatsink 411.

Because non-load-side end portions of each of the twelve phase coil portions 351 that constitute the stator coil 35 are fixed to the non-load-side coil outer circumference fixing member 70, which is an annular integrated member, by the non-load-side coil inner circumference fixing members 69, vibration resistance of the stator coil 35 is improved.

Since an outer circumference of the non-load-side coil outer circumference fixing member 70 is fitted together with and held by the coil fixing groove 71 that is disposed on the non-load-side bracket 42, vibration resistance of the stator coil 35 is further improved.

Since the non-load-side bracket 42 and the non-load-side coil outer circumference fixing member 70 are configured so as to dispose an air gap in the axial direction, even if the temperature of the stator coil 35 rises and heat expansion occurs, the expansion is absorbed, enabling stresses to be prevented from being applied to the stator coil 35.

Since the axial air gap between the non-load-side bracket 42 and the non-load-side coil outer circumference fixing member 70 is filled with the elastic member, thermal resistance between the stator coil 35 and the non-load-side bracket 42 is reduced compared to when the air gap is not filled with the elastic member, improving cooling of the stator coil 35.

In addition, the non-load-side end portions of the stator coil 35 are each fixed to the single non-load-side coil outer circumference fixing member 70 by a separate non-load-side coil inner circumference fixing member 69, and the elastic member fills between the non-load-side coil outer circumference fixing member 70 and the non-load-side bracket 42. Thus, since irregularities in the thermal resistance between each of the twelve phase coil portions 351 and the non-load-side bracket 42 can be reduced, and the upper temperature limit of the phase coil portions 351 and the overall temperature of the stator coil 35 are brought closer to each other, output can be improved up to the temperature limit of the phase coil portions 351.

Since the load-side bracket 41 to which the stator coil 35 is fixed is configured so as to have a liquid-cooled construction, cooling density can be improved, improving coil cooling.

The non-load-side coil outer circumference fixing member 70 is constituted by an annular integrated member, but may be divided into twelve members that correspond to the phase coil portions 351.

Irregularities in the thermal resistance between the non-load-side end portions and the non-load-side bracket 42 of the stator coil 35 can thereby be further reduced.

As shown in FIG. 1, respective turns of the phase coil portions 351 that are fixed by the coil fixing members 58 are lined up in single columns so as to be parallel to a surface of the load-side heatsink 411. In this case, a single layer of rows of turns is formed by the respective rows of turns of the phase coil portions 351 lining up.

Because of that, all of the rows of turns in the single layer are fixed by the coil fixing members 58 and are in contact with the load-side heatsink 411. According to this configuration, thermal resistance between the respective turns of the phase coil portions 351 and the load-side heatsink 411 can be reduced more than if rows of turns in two or more layers were fixed by the coil fixing members 58, further enabling the cooling performance to be improved.

The refrigerant passages 413 of the load-side heatsink 411 are not limited to three as shown in FIG. 4, and there may alternatively be one or two. In such constructions, pressure loss in the refrigerant passages 413 can be reduced.

Embodiment 2

Figure 7:
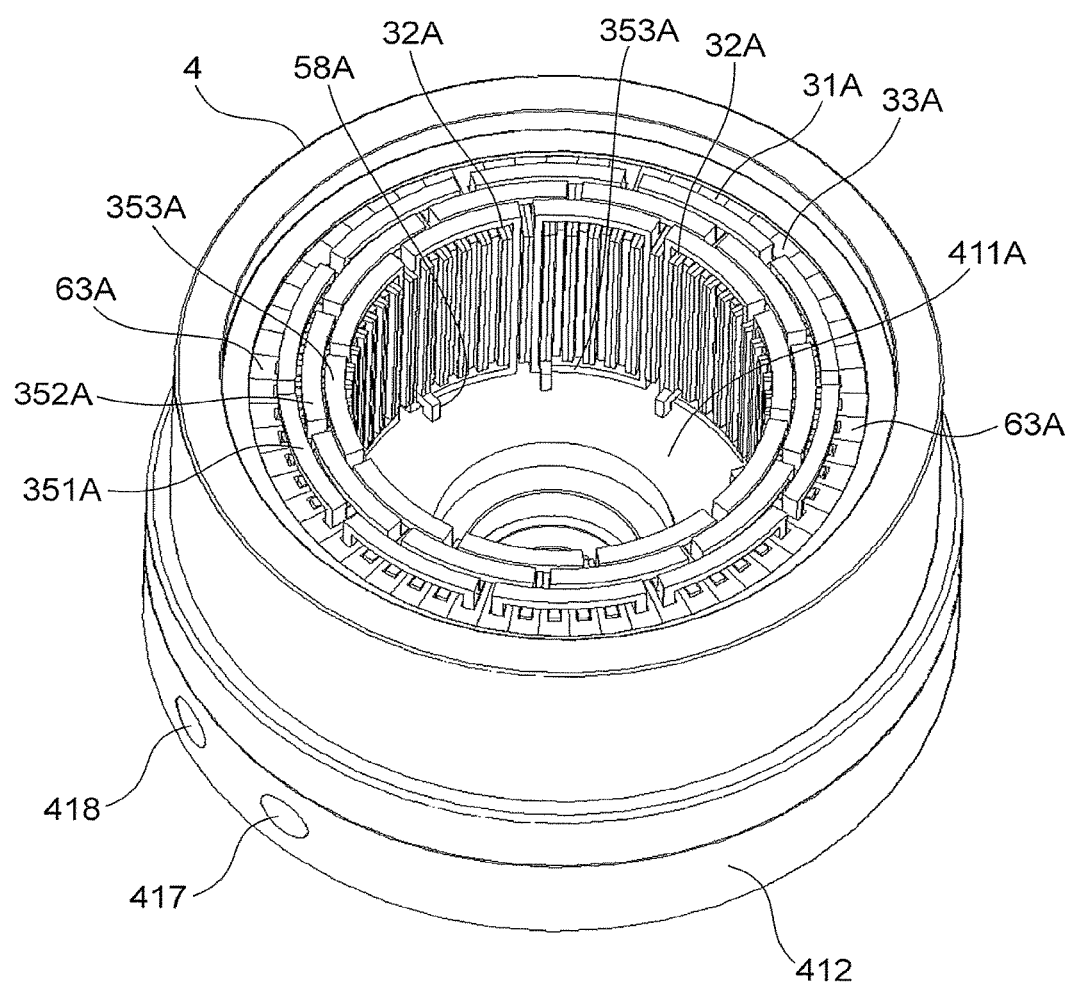
FIG. 7 is an oblique projection that shows a stator, a frame, and a load-side bracket of a motor according to Embodiment 2 of the present invention.
Figure 8:
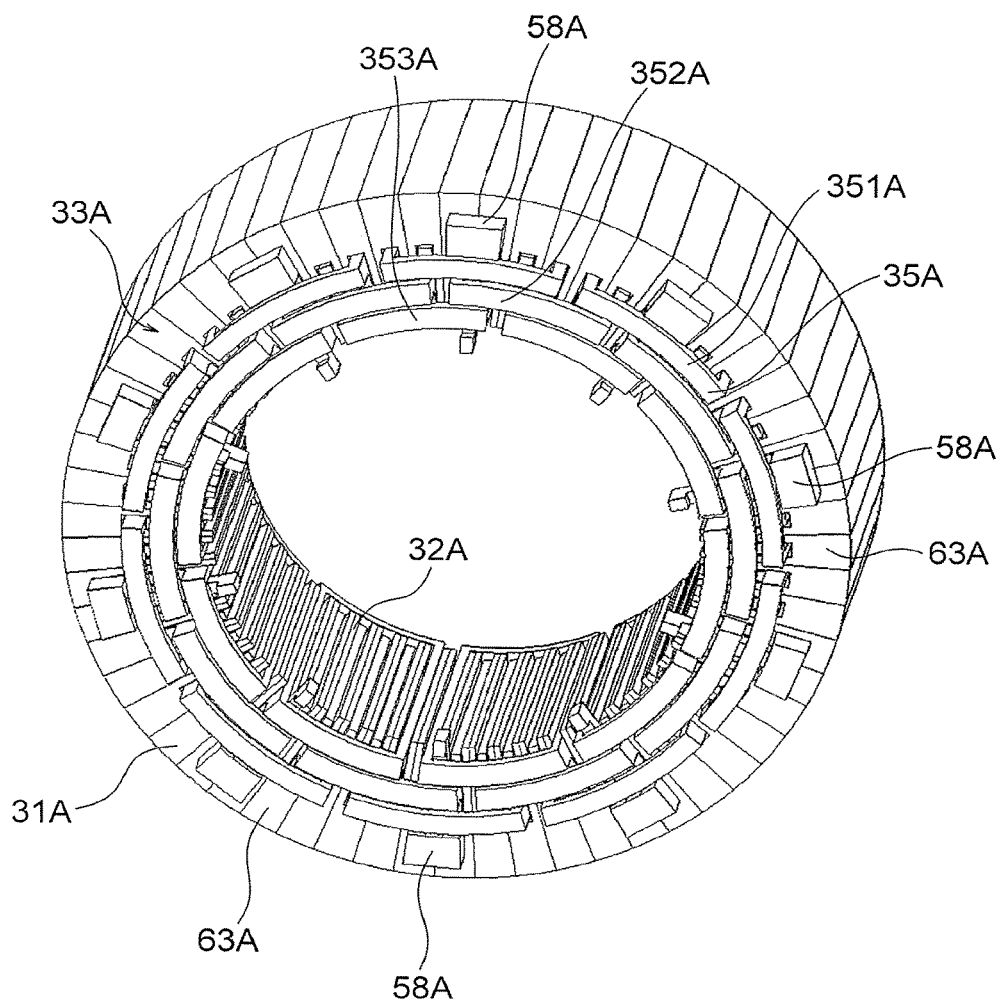
FIG. 8 is an oblique projection that shows a stator coil and coil fixing members from FIG. 7.

FIG. 7 is an oblique projection that shows a stator 3, a frame 4, and a load-side bracket 41 of a motor 1 according to Embodiment 2 of the present invention, and FIG. 8 is an oblique projection that shows a relationship between a stator coil 35A and coil fixing members 58A of the motor 1 according to Embodiment 2 of the present invention.

In FIG. 7, a stator core 33A has sixty tooth portions 32A, and is constituted by sixty stator core pieces 63A in which the stator core 33A is divided into sixty equal sections in a circumferential direction so as to include circumferentially central portions of the tooth portions 32A at the dividing surfaces. The stator core pieces 63A have circular arc-shaped yoke portions 31A.

In FIG. 8, a stator coil 35A is configured into a distributed winding coil by winding such that a second end of a conductor wire is inserted into a sixth slot (a space between adjacent tooth portions 32A) in a circumferential direction counted from a slot into which a first circumferential end of the conductor wire is inserted.

Ten coil fixing members 58A are disposed uniformly in a circumferential direction. When viewed from a load-side of the motor 1, each of the coil fixing members 58A houses a circumferentially central portion of a phase coil portion 351A on an outermost circumference, a counterclockwise end portion of a phase coil portion 352A in a radially central portion, and a clockwise end portion of a phase coil portion 353A on an outermost circumference, and is fixed to a load-side heatsink 411A. Each of the phase coil portions 351A, 352A, and 353A is thereby fixed to the load-side heatsink 411A.

Ten non-load-side coil inner circumference fixing members (not shown) are respectively disposed so as to face circumferential positions at which the coil fixing members 58A are disposed. When viewed from a load side of the motor 1, these non-load-side coil inner circumference fixing members also each house a circumferentially central portion of a phase coil portion 351A on an outermost circumference, a counterclockwise end portion of a phase coil portion 352A in a radially central portion, and a clockwise end portion of a phase coil portion 353A on an outermost circumference, in a similar manner to the coil fixing members 58A, and are fixed to a non-load-side bracket 42.

In this manner, the motor 1 is configured into a ten-pole sixty-slot distributed winding motor.

A remainder of the configuration is similar or identical to that of the motor 1 according to Embodiment 1.

Similar or identical effects to those of the motor 1 according to Embodiment 1 are also exhibited in the distributed-winding motor 1 according to this embodiment.

Embodiment 3

Figure 9:
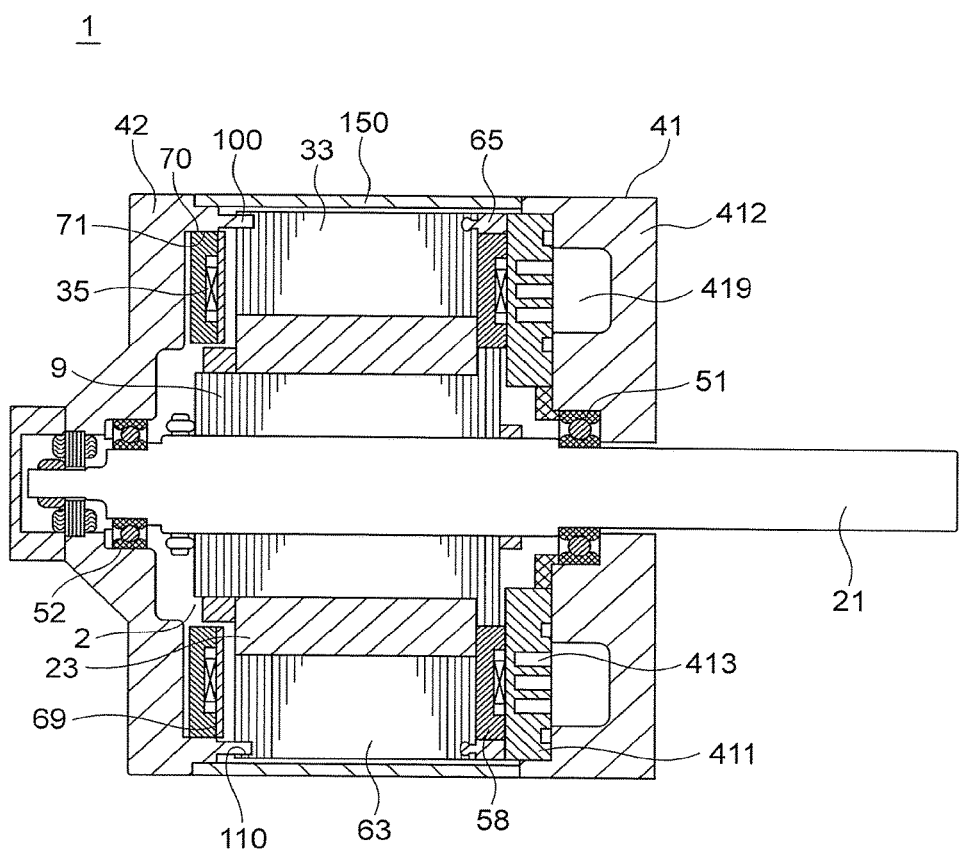
FIG. 9 is a cross section that shows a motor according to Embodiment 3 of the present invention.

FIG. 9 is a cross section that shows a motor 1 according to Embodiment 3 of the present invention.

In the motor 1 according to this embodiment, a non-load-side bracket 42 has twelve pin portions 100 in a circumferential direction.

The pin portions 100 of the non-load-side bracket 42 fit into non-load-side pin apertures 110 that are disposed on respective stator core pieces 63, and perform positioning of the stator core pieces 63, and together with a load-side bracket 41 also clamp and fix the stator core pieces 63 by pushing axially.

The non-load-side bracket 42 is linked to the load-side bracket 41 by bolts 150 that constitute a plurality of linking members that are disposed around an outer circumference of the stator core 33 at a uniform spacing in a circumferential direction.

A remainder of the configuration is similar or identical to that of the motor 1 according to Embodiment 1.

According to the motor 1 according to this embodiment, similar or identical effects to those of the motor 1 according to Embodiment 1 can be achieved, and because the non-load-side bracket 42 also performs positioning of the stator core pieces 63, and is fixed to the load-side bracket 41 by bolts 150 that constitute linking members, the frame 4 that was used in the motor 1 of Embodiments 1 and 2 is no longer necessary, enabling radial dimensions to be reduced in size, and weight can also be reduced.

Embodiment 4

Figure 10:
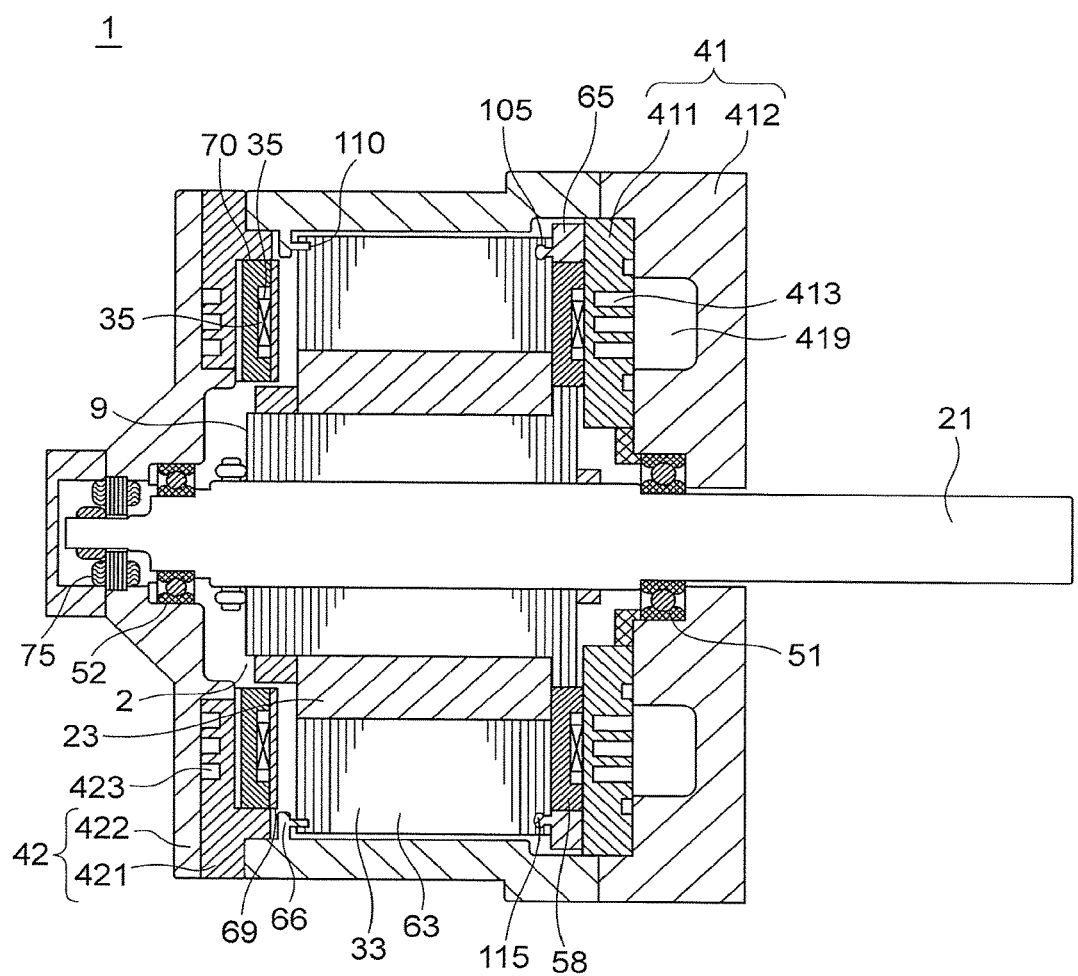
FIG. 10 is a cross section that shows a motor according to Embodiment 4 of the present invention.

FIG. 10 is a cross section that shows a motor 1 according to Embodiment 4 of the present invention.

In the motor 1 according to this embodiment, a non-load-side bracket 42 is constituted by: a non-load-side heatsink 421 that constitutes a second heatsink; and a non-load-side bracket base 422.

The non-load-side heatsink 421 has three parallel refrigerant passages at positions that correspond axially to a stator coil 35.

The non-load-side heatsink 421 and the non-load-side bracket base 422 are fixed in close contact after applying a liquid packing.

A remainder of the configuration thereof is similar or identical to that of the motor 1 according to Embodiment 1.

According to the motor 1 according to Embodiment 4, similar or identical effects to those of the motor according to Embodiment 1 can be achieved, and because two axial end portions of the stator coil 35 are also cooled by the liquid-cooled load-side heatsink 411 and non-load-side heatsink 421, cooling is improved and temperature can be reduced.

Moreover, although not shown, the refrigerant passages of the non-load-side heatsink 421 and the refrigerant passages of the load-side heatsink 411 may be connected to a coolant forward channel and a coolant return channel that are disposed on the frame 4. Thus, one coolant input port that supplies the coolant to the motor 1 and one coolant output port are sufficient, enabling size reductions.

Moreover, in the motor 1 according to each of the above embodiments, permanent magnets were embedded in the rotor core 23 of the rotor 2, but permanent magnets may be attached to the surface of the rotor core 23.

The rotor 2 may be for a switched reluctance motor or a synchronous reluctance motor that does not have permanent magnets, or an induction motor that has a conductor bar instead of permanent magnets.

The coil fixing members 58 and the stator base 65 may be an integrated member.

If so configured, since the number of parts can be reduced, and mounted portions can be reduced, the motor 1 can be reduced in size.

Rectangular conductor wire was used as the conducting wire in the stator coil 35, but round wire may be used.

The coil fixing members 58 need only fix the coil end portions of the phase coil portions 351 of the stator coil 35 in close contact with the load-side heatsink 411, and the groove portions 581 of the coil fixing members 58 may be a shape other than an angular C shape, such as a U shape, or a trapezoidal shape, for example.

The refrigerant passages 413 of the load-side heatsink 411 are not limited to three as shown in FIG. 4, and there may alternatively be four or more.

According to this configuration, the surface area of the refrigerant passages 413 can be increased, enabling heat exchangeability to be improved.

Airtightness of the refrigerant passages 413 of the load-side heatsink 411 is ensured by two O-rings, but airtightness may be ensured using a liquid packing, or a metallic gasket, etc.

A surface of the coil fixing surface 61 of the load-side heatsink 411 may be electrically insulated using a silicone resin coating, or an alumite treatment, or a separate electrically insulating member may be attached to the surface of the coil fixing surface 61.

The load-side heatsink 411 may be disposed at the non-load side.

In that case, both the coil fixing members 58 and the load-side heatsink 411 are also disposed at the non-load-side, and the non-load-side coil inner circumference fixing members 69 and the non-load-side coil outer circumference fixing member 70 are disposed at the load side.

It is not necessary for all of the coil end portions of the phase coil portions 351 to be fixed to the load-side heatsink 411 by the respective coil fixing members 58, and a single phase coil portion 351 only may alternatively be fixed to the load-side heatsink 411 by the coil fixing members 58.

Two or more coil fixing members 58 may be mounted to a single phase coil portion 351.

According to this configuration, contact of the coil end portions of the phase coil portions 351 onto the load-side heatsink 411 is improved, improving cooling, and enabling temperature irregularities to be reduced.

The coil fixing members 58 are fixed to the load-side heatsink 411 using bolts, but the coil fixing members 58 may be fixed to the load-side heatsink 411 by disposing claw-shaped projecting portions on the coil fixing members 8, disposing socket portions on the load-side heatsink 411, and inserting the claw-shaped projecting portion into the socket portions, or the coil fixing members 58 may be fixed to the load-side heatsink 411 by welding or gluing. Using a configuration of this kind, the number of parts in members that fix the coil fixing members 58 to the load-side heatsink 411 can be reduced, improving productivity.

The coil fixing members 58 may also serve as bobbins onto which the phase coil portions 351 are wound. Using a configuration of this kind, because the coil fixing members 58 and the bobbins can be produced as single members, the number of parts can be reduced. Because the conductor wires that constitute the phase coil portions 351 can be wound onto the coil fixing members 58, it also becomes easier to maintain the shape of the phase coil portions 351.

Embodiment 5

Figure 11:
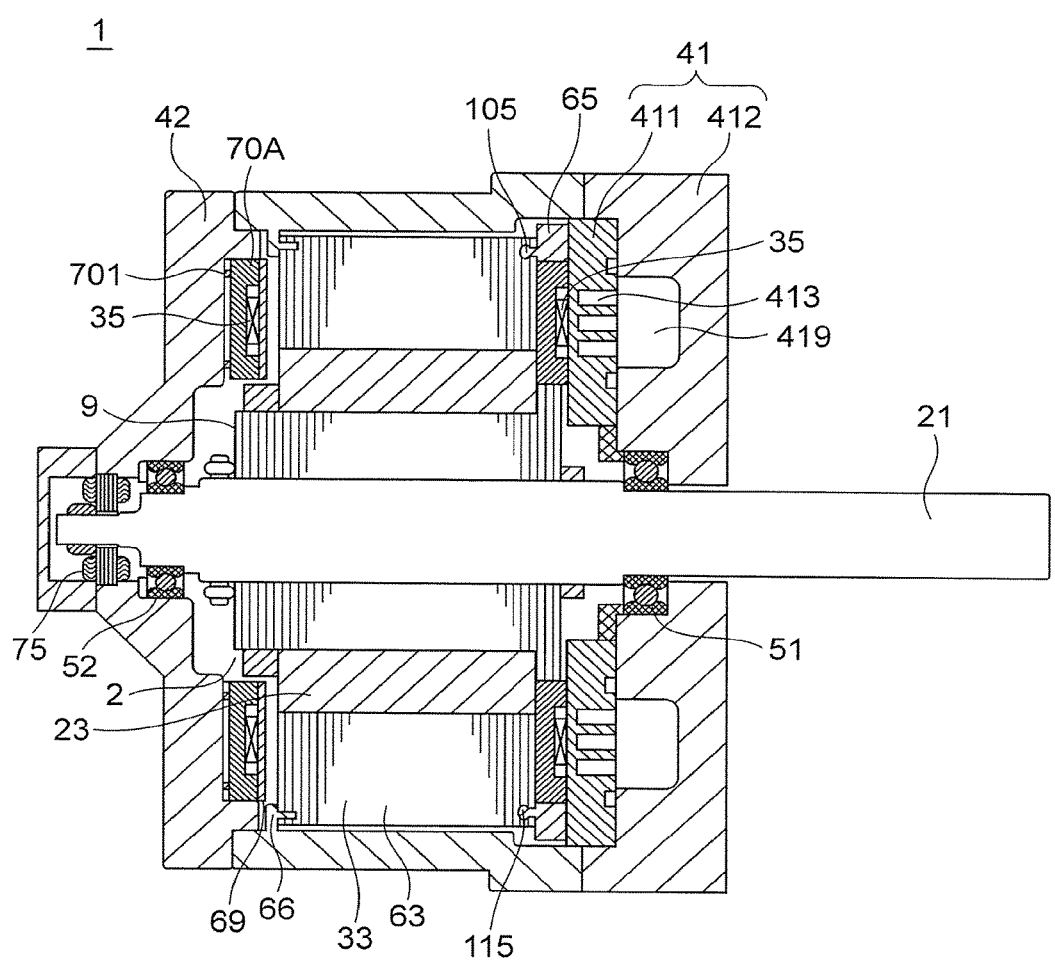
FIG. 11 is a cross section that shows a motor according to Embodiment 5 of the present invention.
Figure 12:
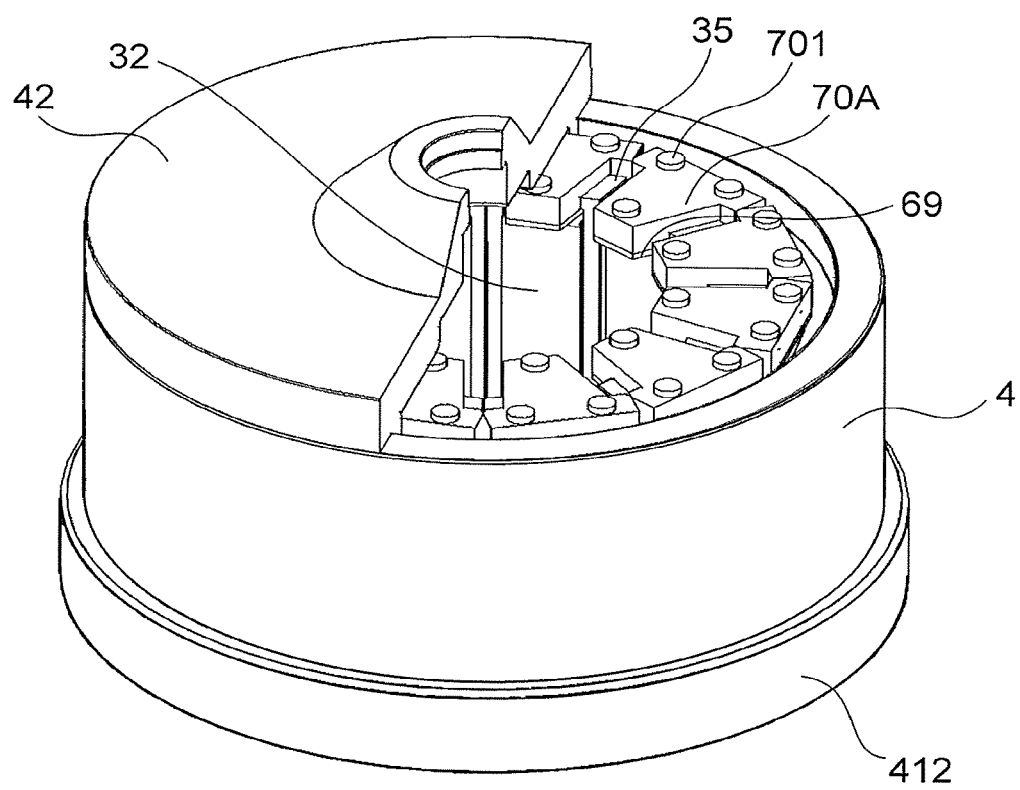
FIG. 12 is a partially cutaway oblique projection that shows a construction for mounting springs in the motor according to Embodiment 5 of the present invention.

FIG. 11 is a cross section that shows a motor 1 according to Embodiment 5 of the present invention, and FIG. 12 is a partially cutaway oblique projection that shows a construction for mounting springs 701 in the motor 1 according to Embodiment 5 of the present invention, in which a portion of a non-load-side bracket is cut away.

In the motor 1 according to this embodiment, a non-load-side end portion of respective phase coil portions 351 is clamped between non-load-side coil inner circumference fixing members 69 and non-load-side coil outer circumference fixing members 70A. The non-load-side coil inner circumference fixing members 69 are fixed to the non-load-side coil outer circumference fixing members 70A by bolts. Twelve non-load-side coil outer circumference fixing members 70A are produced using electrically insulating members, or alternatively electroconductive members to which an electrically insulating treatment has been applied to a front surface, and are disposed circumferentially. Springs 701 are disposed between each of the non-load-side coil outer circumference fixing members 70A and a non-load-side bracket 42.

As shown in FIG. 12, three springs 701 are disposed on each non-load-side coil outer circumference fixing member 70A. Specifically, one spring 701 is disposed on a radially inner circumferential side of the non-load-side coil outer circumference fixing member 70A, and two on a radially outer circumferential side. In this case, the coil fixing members 58 are omitted.

Moreover, a remainder of the configuration is configured in a similar or identical manner to that of Embodiment 1 above.

Similar or identical effects to those of the motor 1 according to Embodiment 1 can also be achieved in the motor 1 according to this embodiment.

According to the motor 1 according to this embodiment, because the springs 701 include a function of pressing the phase coil portions 351 against the load-side heatsink 411, and a function of absorbing dimensional changes in the phase coil portions 351 that arise due to the phase coil portions 351 expanding due to temperature increases, the number of parts can be reduced, and assemblability can be improved.

Moreover, in each of the above embodiments, the stator core 33 is constituted by a plurality of stator core pieces 63, but may alternatively be a single body that is connected continuously.

In each of the above embodiments, cases in which the present application is used in a motor 1 have been explained, but similar or identical effects can also be achieved if the present invention is applied to generators or generator-motors that are rotary electric machines.

Now, the motor 1 may be driven by an inverter that uses semiconductors of silicon (Si), but may alternatively be driven by an inverter that uses wide bandgap semiconductors such as silicon carbide (SiC) or gallium nitride (GaN). Because switching frequency can be increased if the motor 1 is driven by an inverter that uses wide gap semiconductors, enabling electric current pulsation that is generated by the switching of the inverter to be reduced, high-frequency loss that arises in the stator coil 35 can be reduced, and the motor 1 can be further reduced in size.

The invention claimed is:

1. A rotary electric machine comprising:
    a stator core that surrounds an outer circumference of a rotor, and that comprises:
        a yoke portion; and
        a plurality of tooth portions in which tip portions protrude radially inward toward a central axis of said rotor from an inner circumferential surface of said yoke portion;
    a first heat sink that is disposed so as to face a first end surface of said stator core in an axial direction of said stator core;

a stator coil that comprises a plurality of phase coil portions that are configured using conducting wires that are mounted to said stator core;

a coil fixing member that is disposed on coil end portions of said phase coil portions, that fixes said coil end portions in a state of surface contact with said first heatsink;

a cylindrical frame that surrounds said stator core;

a first bracket that is disposed on a first axial end portion of said frame, and that comprises said first heatsink on a side near said frame;

a second bracket that is disposed on a second axial end portion of said frame; and a non-load-side coil fixing member that is disposed on coil end portions that are near said second bracket in said phase coil portions so as to be divided into a plurality of pieces so as to correspond to said plurality of phase coil portions, and that fixes said coil end portions that are near said second bracket, said non-load-side coil fixing member being movably spaced apart from said second bracket.

2. The rotary electric machine according to claim 1, wherein said coil fixing member is fixed to said first heatsink.

3. The rotary electric machine according to claim 1, wherein:

said phase coil portions are ring-shaped concentrated winding coils that are constituted by said conducting wires, which are wound onto said tooth portions; and said coil fixing member comprises a groove portion that houses said coil end portions from inside said phase coil portions.

4. The rotary electric machine according to claim 3, wherein:

notch portions are formed on two sides of said coil fixing member at portions at which said conducting wires enter and exit said groove portion.

5. The rotary electric machine according to claim 3, wherein:

said conducting wires are rectangular conductor wires; and a radial dimension of said stator core at said groove portion is equal to a radial dimension of said coil end portions of said phase coil portions, and an axial dimension of said stator core at said groove portion is equal to an axial dimension of said coil end portions of said phase coil portions.

6. The rotary electric machine according to claim 1, wherein:

said phase coil portions are distributed winding coils that are constituted by said conducting wires, which are wound so as to span a plurality of said tooth portions; and said coil fixing member comprises a groove portion that houses each of said coil end portions from inside said phase coil portions in an axial direction of said stator core.

7. The rotary electric machine according to claim 1, wherein:

said plurality of phase coil portions are each fixed to said first heatsink by a dedicated coil fixing member.

8. The rotary electric machine according to claim 1, wherein:

said coil fixing member fixes said plurality of phase coil portions to said first heatsink together.

9. The rotary electric machine according to claim 1, wherein a coil fixing groove that holds an outer circumference of said non-load-side coil fixing member is formed on said second bracket, said non-load-side coil fixing member being held by said second bracket in a state of being fitted together with said coil fixing groove.

10. The rotary electric machine according to claim 1, wherein an electrically insulating medium is disposed between said coil end portions and said first heatsink.

11. The rotary electric machine according to claim 1, wherein refrigerant passages are formed on said first heatsink.

12. The rotary electric machine according to claim 1, further comprising an elastic member that is filled between said non-load-side coil fixing member and said second bracket.

13. A rotary electric machine comprising:

a stator core that surrounds an outer circumference of a rotor, and that comprises:

a yoke portion; and a plurality of tooth portions in which tip portions protrude radially inward toward a central axis of said rotor from an inner circumferential surface of said yoke portion;

a first heat sink that is disposed so as to face a first end surface of said stator core in an axial direction of said stator core;

a stator coil that comprises a plurality of phase coil portions that are configured using conducting wires that are mounted to said stator core;

a coil fixing member that is disposed on coil end portions of said phase coil portions, that fixes said coil end portions in a state of surface contact with said first heatsink;

a first bracket that is disposed on a first axial end portion of said stator core, and that comprises said first heatsink;

a second bracket that is disposed on a second axial end portion of said stator core;

a linking member that is disposed on an outer circumferential side of said stator core, and that joins said first bracket and said second bracket; and a non-load-side coil fixing member that is disposed on coil end portions that are near said second bracket in said phase coil portions so as to be divided into a plurality of pieces so as to correspond to said plurality of phase coil portions, and that fixes said coil end portions that are near said second bracket, said non-load-side coil fixing member being movably spaced apart from said second bracket.

14. The rotary electric machine according to claim 13, wherein said coil fixing member is fixed to said first heatsink.

15. The rotary electric machine according to claim 13, wherein:

said phase coil portions are ring-shaped concentrated winding coils that are constituted by said conducting wires, which are wound onto said tooth portions; and said coil fixing member comprises a groove portion that houses said coil end portions from inside said phase coil portions.

16. The rotary electric machine according to claim 15, wherein:

notch portions are formed on two sides of said coil fixing member at portions at which said conducting wires enter and exit said groove portion.

17. The rotary electric machine according to claim 15, wherein:
said conducting wires are rectangular conductor wires; and
a radial dimension of said stator core at said groove portion is equal to a radial dimension of said coil end portions of said phase coil portions, and an axial dimension of said stator core at said groove portion is equal to an axial dimension of said coil end portions of said phase coil portions.

18. The rotary electric machine according to claim 13, wherein:
said phase coil portions are distributed winding coils that are constituted by said conducting wires, which are wound so as to span a plurality of said tooth portions; and
said coil fixing member comprises a groove portion that houses each of said coil end portions from inside said phase coil portions in an axial direction of said stator core.

19. The rotary electric machine according to claim 13, wherein:
said plurality of phase coil portions are each fixed to said first heatsink by a dedicated coil fixing member.

20. The rotary electric machine according to claim 13, wherein:
said coil fixing member fixes said plurality of phase coil portions to said first heatsink together.

21. The rotary electric machine according to claim 13, wherein a coil fixing groove that holds an outer circumference of said non-load-side coil fixing member is formed on said second bracket, said non-load-side coil fixing member being held by said second bracket in a state of being fitted together with said coil fixing groove.

22. The rotary electric machine according to claim 13, wherein said second bracket is constituted by a second heatsink that faces said stator core and a bracket base that is integrated with said second heatsink.

23. The rotary electric machine according to claim 13, wherein an electrically insulating medium is disposed between said coil end portions and said first heatsink.

24. The rotary electric machine according to claim 13, wherein refrigerant passages are formed on said first heatsink.

25. The rotary electric machine according to claim 13, further comprising an elastic member that is filled between said non-load-side coil fixing member and said second bracket.

* * * * *